March 5, 1940.　　　P. B. KOCH　　　2,192,382
GRAIN CUTTING MACHINE
Filed Jan. 9, 1939　　　3 Sheets-Sheet 2
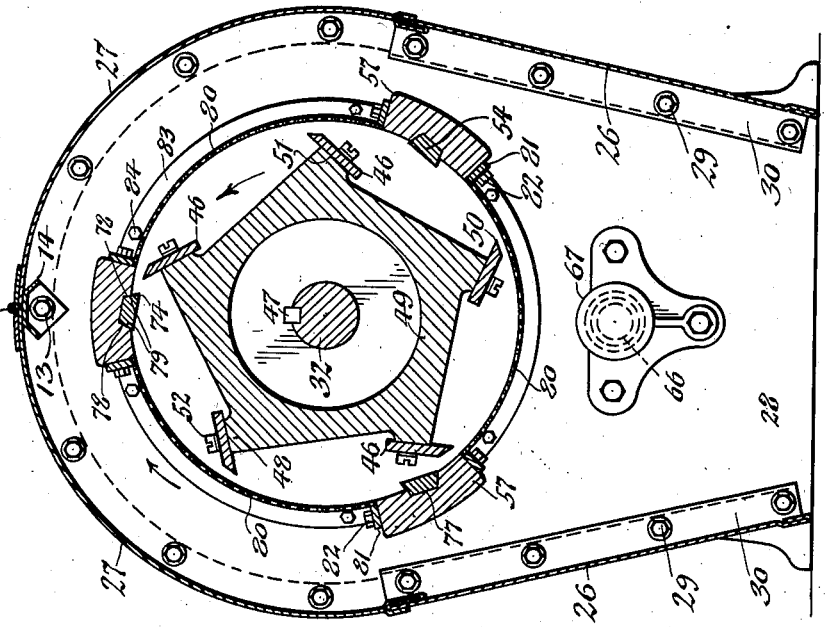
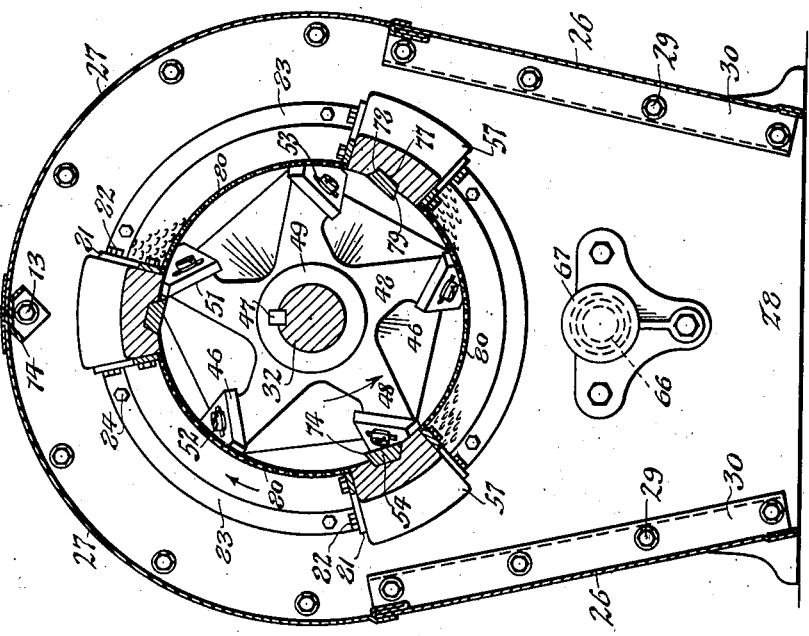
INVENTOR
Philip B. Koch
BY Popp & Popp
ATTORNEYS

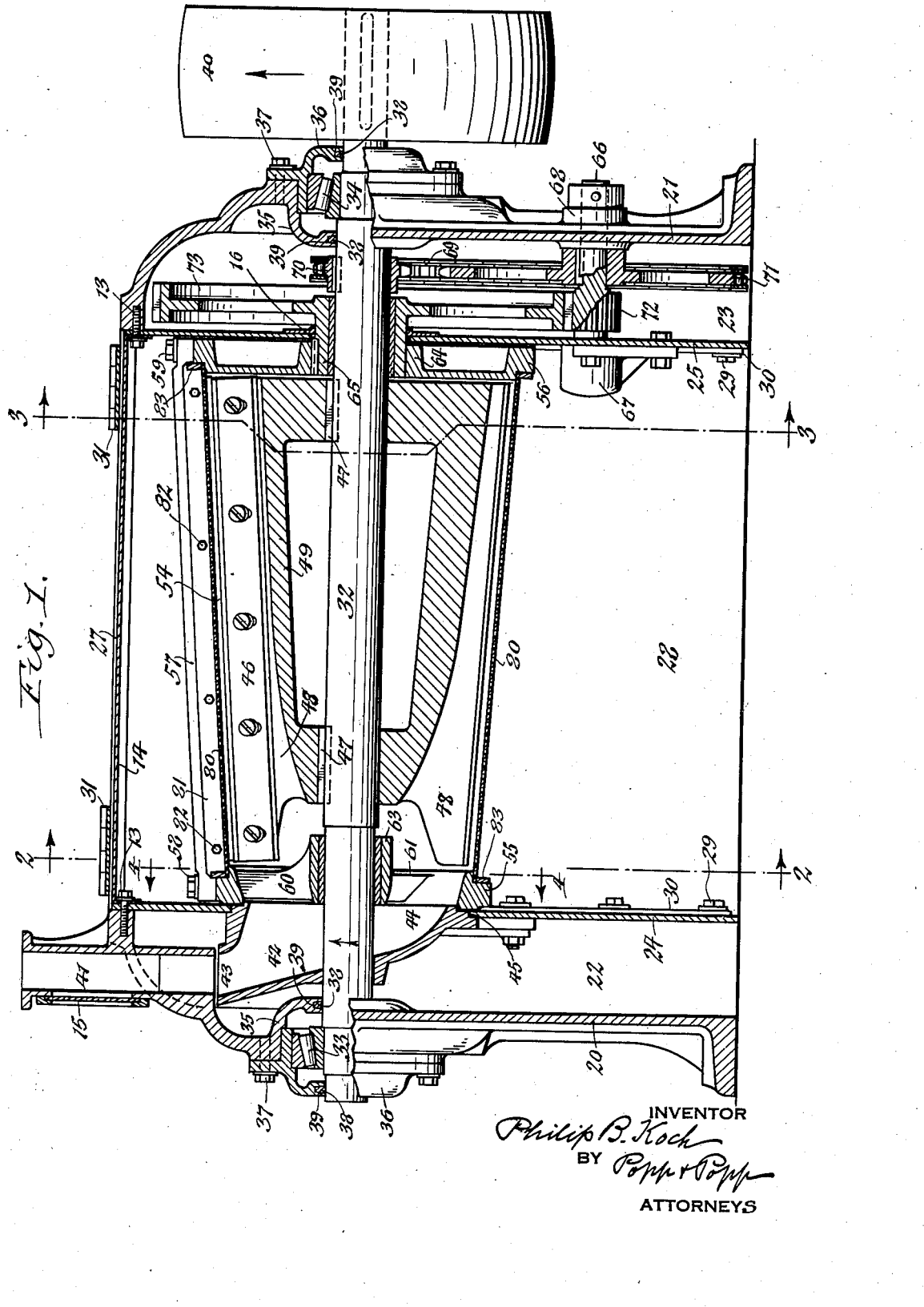

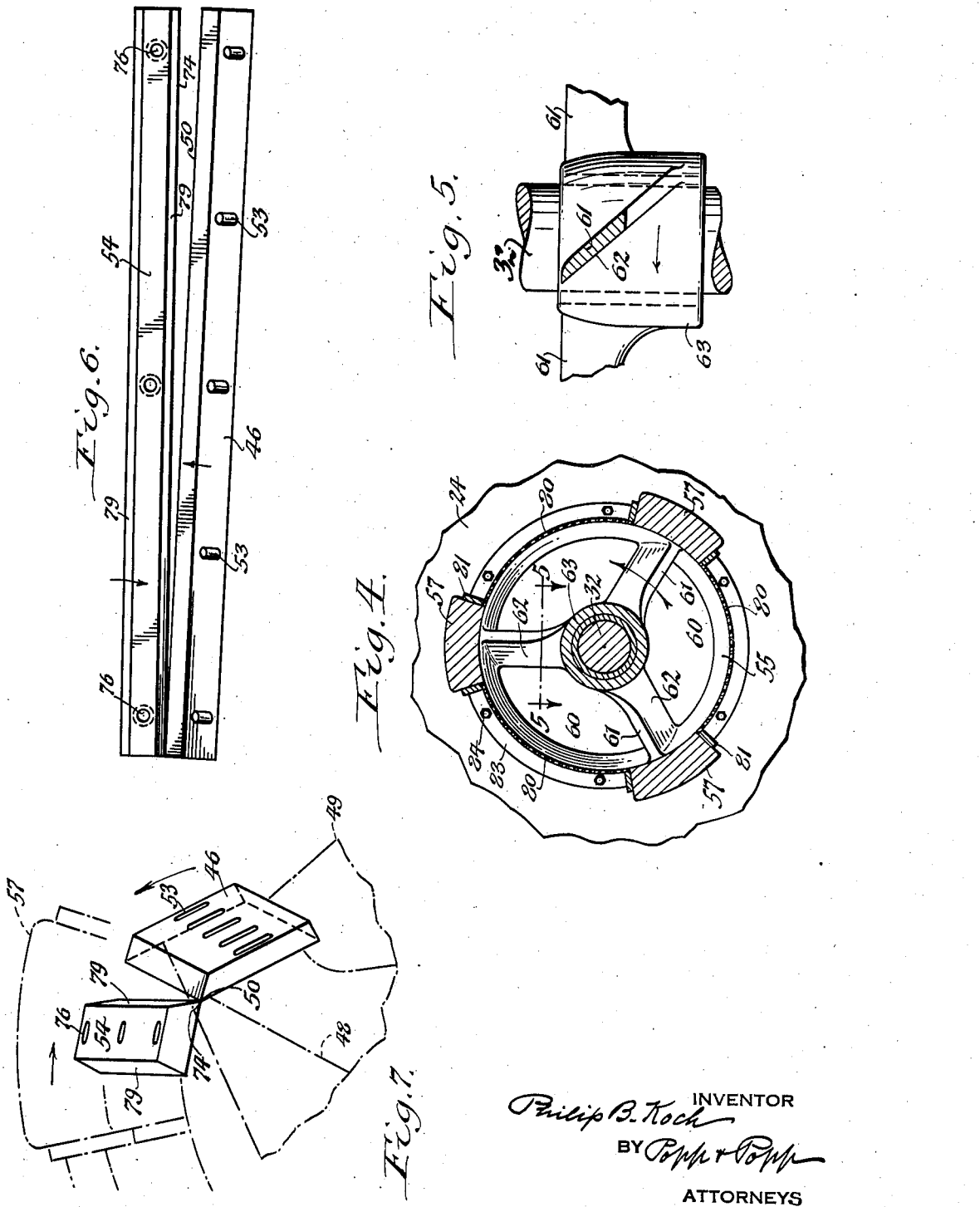

Patented Mar. 5, 1940

2,192,382

UNITED STATES PATENT OFFICE 2,192,382

GRAIN CUTTING MACHINE

Philip B. Koch, Hanover Center, N. Y., assignor to S. Howes Co. Inc., Silver Creek, N. Y., a corporation of New York Application January 9, 1939, Serial No. 249,842

2 Claims. (Cl. 83—6)

This invention relates to a machine which is more particularly designed for cutting or cracking grain, such as corn, so as to render the same more suitable for use either by itself or by mixture with other materials, as feed for animals in the poultry, dairy and other industries.

The objects of this invention are to provide a machine of this character which will crack or cut the grain faster and more effectively and with less power than has been possible with machines of this type heretofore in use for this purpose; also to so arrange the cooperating blades that the same engage each other with a shearing action and produce cutting effects successively by the different parts of the several blades on one grain at a time whereby the load is distributed over the entire cutting area of the blades, thereby avoiding irregularity of operation; also to so organize the machine that a larger screen area is employed, the screen is self-cleaning and no cutting is done by the screen; and also to render all parts of the machine more easily accessible and removable for inspection, cleaning and repairing.

In the accompanying drawings:

Fig. 1 is a vertical longitudinal section of a grain cutter embodying the improvements of this invention.

Figs. 2 and 3 are vertical transverse sections, taken on lines 2—2 and 3—3, Fig. 1, respectively.

Fig. 4 is a fragmentary cross section, on an enlarged scale, taken on line 4—4, Fig. 1.

Fig. 5 is a longitudinal section, taken on line 5—5, Fig. 4.

Fig. 6 is a plan view of a pair of cooperating cutter blades mounted on relatively movable parts of the machine.

Fig. 7 is an end view of a pair of cutter blades showing the manner in which the same cooperate while rotating in conical paths relatively to one another.

In the following description similar characters of reference indicate like parts in the several figures of the drawings.

The main frame of this machine which supports the several working parts is so constructed that it also serves as a casing or housing for enclosing these parts. In its preferred form this housing frame comprises hollow transverse standards 20, 21 arranged transversely at the front and rear ends of the machine and dished outwardly so as to form front and rear chambers 22, 23 therein, upright front and rear partitions 24, 25 arranged transversely across the inner sides of the front and rear standards so as to form closures for the inner sides of said chambers, lower flat longitudinal walls 26, 26 arranged on opposite sides of the space between the lower parts of the front and rear standards and partitions, and two upper curved walls 27 arranged between the upper parts of the standards and partitions and forming with said lower walls and partitions a central chamber or compartment 28 between the end chambers 22, 23. Each of the standards and the respective partition and the adjacent ends of the central side walls are preferably connected by screws 29 passing through inwardly turned flanges 30 on the respective ends of the side walls 26 and the edge portions of the respective partition and into the respective standard. The upper edges of the upper walls 27 rest on a longitudinal bar 14 which is connected at its ends by screws 13 with the front and rear standards and these upper wall sections are connected at their upper edges by hinges 31 so that the same serve the purpose of lids which can be lowered for engaging the lower edges of the same with the side walls 26 and completing the closure for the central chamber or compartment 28 during normal operation of the machine, as shown in Figs. 2 and 3, and these upper walls can also be raised for uncovering this central chamber and rendering the same conveniently accessible for inspecting, repairing or adjusting any of the internal parts of the machine therein. The lower ends of the front, rear and central chambers or compartments 22, 23, 28 all open downwardly but only the open lower end of the central chamber is utilized for discharging grain from the machine after the same has been reduced to the desired size.

The standards are preferably made of cast iron and the partitions and walls are made of sheet metal, thereby producing an enclosing frame which is very strong, yet light, rigid and durable.

The numeral 32 represents the main driving shaft of the machine which is arranged horizontally and extends lengthwise through the housing frame and is journaled at its front and rear ends in bearings 33, 34, preferably of the roller type, which are mounted on the front and rear standards so as to be accessible from the exterior thereof. For this purpose each of these bearings is arranged within a casing comprising an inner dish shaped section 35 formed integrally on the respective standard and an outer dish shaped section 36 detachably secured to the respective standard by screws 37. Each of the bearings 33, 34 is arranged between the driving shaft 32 and the outer section 36 of one of the bearing casings and dust proof joints are produced between this shaft and the inner and outer sections of these bearing casings by means of packings or gaskets 38 arranged in an annular groove 39 in each of these casing sections and engaging the periphery of the driving shaft, as shown in Fig. 1.

Motion may be transmitted to the driving shaft in any approved manner as by means which include a driving belt passing around a driving pulley 40 on the rear end of the driving shaft.

Within the central chamber 28 is arranged the cutter mechanism whereby the grain is cut or reduced in size. The grain to be cut is supplied to this cutter mechanism by a sectional feed device or conduit which comprises an upper feed spout 41 formed integrally with the upper part of the front standard and having an observation window 15 and extending vertically through the same, and a lower delivery chute 42 surrounding the front part of the driving shaft within the front chamber 22 and connected with the front partition and having an upper inlet 43 arranged below the lower end of the feed spout and a lower outlet 44 which projects rearwardly through an opening 45 in the front partition, as shown in Fig. 1.

The cutter mechanism in its preferred form is constructed in part as follows:

The numeral 49 represents the tubular hub of a reel which is secured to the driving shaft by keys 47 or otherwise and provided on its periphery with a plurality of supporting arms 48 which carry a plurality or set of inner cutter blades or knives 46. These reel arms extend nearly the full length of the central chamber and the cutter blades mounted thereon are of the same length. Each of the cutter blades has the form of a narrow flat plate or bar which is bevelled on its front or advancing longitudinal side to provide a cutting edge 50 at the corner between its narrow front side and its wide inner side and is mounted in an inclined position on the respective arm of the reel so that the same is arranged in a plane tangential to the axis about which the reel rotates and has its toe or advancing side farthest from said axis and its heel or trailing side nearest to said axis, as shown in Figs. 2, 3 and 7. Each of these inner cutter blades is preferably secured to the inclined seat 51 on the outer end of the respective reel arm by screws 52 passing through transverse slots 53 in the blade and into this arm whereby this blade may be adjusted tangentially for bringing its cutting edge into its operative position and permit of sharpening the same and taking up wear. The number of blades in the inner set may vary but the same preferably consists of an odd number, for example, five, as shown in Figs. 2 and 3, for a purpose which will presently appear, and the several blades are equally spaced in a circular row around the axis of the reel which is of conical form and flares or enlarges from the front part of the central or cutting chamber to the rear part of the same.

Surrounding the reel and its blades within the cutting chamber is a drum which carries a plurality or set of outer cutter blades 54 for cooperation with the inner set of blades 46 and which is rotatable about the axis of the driving shaft and reel but in an opposite direction to the same. This drum comprises a front head 55 arranged between the front partition and the front end of the cutter reel, a rear head 56 arranged between the rear end of the cutter reel and the rear partition and a plurality of longitudinal bars 57, preferably three in number, arranged in an annular row around the cutter reel and each connected at its front and rear ends with the corresponding peripheral parts of the front and rear drum heads by screws 58, 59, respectively. The front drum head is of skeleton or open-work form and provided with a plurality of passages 60 through which the grain to be cut flows from the delivery chute 42 into the drum and a plurality of radial arms 61 which alternate with said passages and each of which is provided with an inclined face 62 which is adapted to engage with a cam or wedge action against the grain in the respective passage 60 and convey the same positively into the cutter drum. The front head of the drum is provided with a hub 63 which is journaled on the adjacent part of the driving shaft. The rear head of the drum is solid so as to prevent the passage of any material therethrough and the same is provided with a hub 64 which is secured to a bearing sleeve or hub 65 journaled on the adjacent part of the driving shaft. The cutter drum and cutter reel turn about the same axis but are free to rotate independently of one another, and in the preferred construction the cutter reel turns rapidly in one direction and the cutter drum turns comparatively slowly in the opposite direction. This movement of the cutter drum is preferably derived from the driving shaft by a motion transmitting gearing which is arranged in the rear gear chamber 23 and which is constructed as follows:

The numeral 66 represents a short countershaft extending horizontally and lengthwise across the lower part of the gear chamber and journaled at its opposite ends in bearings 67, 68 on the rear partition 25 and the rear standard 21. This countershaft is turned in the same direction as the driving shaft but at a reduced speed by a sprocket chain belt 69 passing around a sprocket pinion 70 secured to the driving shaft next to the rear standard and a sprocket wheel 71 arranged on the rear part of the countershaft within the gear chamber 23, as shown in Fig. 1. On its front part within this gear chamber 23 the countershaft has secured thereto a spur gear pinion 72 which meshes with a large spur gear wheel 73 in the upper part of the gear chamber. The bearing sleeve 65 of the cutter drum which turns on the driving shaft serves as the hub of the sprocket wheel 73 and passes through an opening 16 in the rear partition 25, thereby causing the cutter drum to be turned from the driving shaft at less speed than the cutter reel and in the opposite direction.

The outer set of cutter blades 54 also consists of an odd number, preferably three, and these are arranged in an annular row and spaced equidistant from each other, as shown in Figs. 2 and 3. Each of the outer set of cutter blades is constructed in the form of a flat bar which is arranged lengthwise and secured to the inner side of one of the drum bars 57 so that the same tilts inwardly toward the axis about which the cutter drum turns and brings the cutting edge 74 at the inner front corner of this blade close to the path of the cutting edges 50 of the inner set of blades 46. Each outer cutter blade is rigidly secured to the inner side of one of the drum bars by screws 75 passing through openings 76 in the respective outer cutter blade and into the companion drum bar. The latter is provided on its inner side with a longitudinal groove 77 which receives the outer portion of this blade and the sides 78 of this groove converge outwardly and are engaged by the correspondingly converging sides 79 of the outer cutter blade 54, this producing a wedge action between these parts which holds them tightly together. The several cutter blades 54 forming the outer set are inclined relative to the axis of the cutter reel and cutter drum so that together they form a cone which flares or enlarges from the front end to the rear end of the drum, the angle of this cone being the same as the cone formed by the several cutter blades of the inner set, thereby causing the cutting edges of the two sets of blades to pass each other uniformly throughout the length of the several blades and produce a like cutting action on the grain by all parts of their cutting edges.

The several spaces between the front and rear heads and the blade supporting bars of the drum are closed by screen sections 80 each of which is curved to form a segment of a rearwardly flaring conical screen which separates the fine particles of grain which have been reduced sufficiently in size from the coarse particles and permits the fine particles to pass through the screen and into the cutter chamber from the lower end of which they are discharged from the machine, while the coarse particles are retained in the drum and subjected to the cutting action between the sets of blades until they are reduced sufficiently in size to pass through the screen. Each of the screen sections is detachably mounted on the drum by outwardly projecting flanges 81 arranged on the longitudinal edges of the screen section and secured by screws 82 to the drum bars 57, and curved flanges 83 projecting outwardly from the curved ends of the screen section and secured by screws 84 to the front and rear heads of the drum, as shown in Figs. 1, 2 and 3.

The set of cutter blades of the reel and the set of cutter blades on the drum are so mounted that these two sets of blades pass each other at an angle and produce a shearing cut on the grain from the front ends toward the rear ends of these blades, thereby effecting this cutting action gradually and easily and also causing the blades of each pair which cooperate to only cut one grain at a time in one or another part of their opposing cutting edges. In the preferred construction this relative arrangement of the blades of the inner and outer sets is obtained by mounting the blades 54 of the outer set on the drum so that each of these blades is arranged in a plane extending lengthwise and radially through the axis of the drum and by mounting each of the blades 46 of the inner set in a plane which extends at an angle to the axis of the reel and laterally therefrom, as shown in Figs. 6 and 7.

In the operation of this machine the grain to be cut which is delivered into the drum by the feed spout 41 and chute 42 is carried lengthwise from the front end to the rear end of the drum by the action of the inclined faces 62 on the conveyer arms 61 and also by the conical arrangement of the longitudinal bars 57, outer blades 54 and screen sections 80 which rotate about a horizontal axis and therefore cause the grain to flow by gravity on the lower descending parts of the drum and distribute itself lengthwise thereover.

While in the lower part of the drum the grain is caught between the cutting edges of the outer set of blades on the drum and the cutting edges of the inner set of blades on the reel which move in opposite directions and thereby cause said grain to be cut and reduced in size until the particles are sufficiently small to pass through the screen and escape into the central chamber 28 of the housing preparatory to leaving the machine. As the drum rotates the grain is agitated and it is lifted on the rising side of the drum, thereby promoting separation of the fine particles from the coarse particles and facilitating passage of the fine particles through the screen, thus enabling the cutter blades to act more effectively on the coarse particles and increase the capacity of the machine accordingly.

While the blades of the inner and outer set are on the upper parts of the reel and drum the same are clear of the bed of grain in the lower part of the drum, thereby causing any grain which may have adhered to the blades while the same were in the lower part of the drum to be removed therefrom as the blades pass each other in the upper part of the drum, and thus effect self-cleaning of the blades and maintain the same in a good working condition.

By employing an odd number of blades in the inner set and an odd number in the outer set it is impossible for more than one blade of the reel to cooperate with one blade of the drum at any time, and as a cooperating pair of reel and drum blades can only perform a cutting operation at one or another point throughout the length thereof at any one time, it follows that this machine will only cut one grain at a time, thereby maintaining a uniform load on the machine and permitting the same to be operated with less power and at a high speed which will yield increased capacity.

Moreover this machine is of compact and sturdy construction, its several parts are protected so that the same are not likely to get out of order and its several parts, particularly the screen sections, are readily accessible for removal, inspection, adjustment and repairs.

Furthermore, the construction of the drum provides a larger screen area and a correspondingly increased output and the life of the screen is also increased inasmuch as all the cutting of the grain is done by the cutter blades and no cutting is done by the screen sections themselves. Due to the present construction of the blades or knives and manner of mounting and operating them, the wear on the same is materially reduced so that they last longer and require less frequent sharpening.

Although in the organization shown in the drawings the reel and drum and the blades and screen sections mounted thereon are generally of conical form it is to be understood that the same may be generally of cylindrical form and still embody the essential features of these improvements.

If desired the reel and drum may be turned in the same direction but at different speeds so that the blades on one of these rotating members will pass those on the other rotating member and produce a cutting action on the grain between the same.

I claim as my invention:

1. A grain cutting machine comprising an outer set of cutter blades arranged in an annular row, an inner set of cutter blades arranged in an annular row and cooperating with said outer blades, a driving shaft upon which said inner set of blades is mounted, and means for supporting said outer set of blades including a front spider head which is mounted on the driving shaft and provided with passages for the grain to be cut, a rear closed head mounted on said driving shaft, longitudinal bars connecting said heads and carrying said outer cutter blades, and screen sections mounted on said drum between the heads and bars thereof.

2. A grain cutting machine comprising an outer set of cutter blades arranged in an annular row, an inner set of cutter blades arranged in an annular row and cooperating with said outer blades, a driving shaft upon which said inner set of blades is mounted, and means for supporting said outer set of blades including a front spider head which is mounted on the driving shaft and provided with passages for the grain to be cut, a rear closed head mounted on said driving shaft, longitudinal bars connecting said heads and carrying said outer cutter blades, and segmental screen sections arranged in the spaces between the longitudinal bars and heads of the drum and each provided with longitudinal side flanges secured to said bars and curved end flanges secured to said heads.

PHILIP B. KOCH.